(12) United States Patent
Mayer et al.

(10) Patent No.: US 6,609,414 B2
(45) Date of Patent: Aug. 26, 2003

(54) APPARATUS FOR CONDUCTING LEAKAGE TESTS ON SEALED PACKAGES

(75) Inventors: Daniel W. Mayer, Wyoming, MN (US); Craig K. Loebig, Monticello, MN (US)

(73) Assignee: Mocon, Inc., Minneapolis, MN (US)

( * ) Notice: Subject to any disclaimer, the term of this patent is extended or adjusted under 35 U.S.C. 154(b) by 0 days.

(21) Appl. No.: 09/909,385

(22) Filed: Jul. 19, 2001

(65) Prior Publication Data

US 2003/0015021 A1 Jan. 23, 2003

(51) Int. Cl.[7] ................................................ G01M 3/04
(52) U.S. Cl. ............................. 73/40.7; 73/49.8; 73/52
(58) Field of Search ...................... 73/40.7, 49.8, 73/52

(56) References Cited

U.S. PATENT DOCUMENTS

| | | | | |
|---|---|---|---|---|
| 4,774,830 A | * | 10/1988 | Hulsman | 73/49.3 |
| 4,791,806 A | * | 12/1988 | Wade | 73/40.7 |
| 4,899,574 A | * | 2/1990 | Potteiger | 73/52 |
| 4,991,574 A | | 2/1991 | Pocknell | |
| 5,149,105 A | * | 9/1992 | Beaver et al. | 277/312 |
| 5,150,605 A | * | 9/1992 | Simpson | 73/49.3 |
| 5,156,329 A | * | 10/1992 | Farrell | 229/125.35 |
| 5,285,678 A | * | 2/1994 | McDaniel et al. | 73/49.3 |
| 5,333,491 A | * | 8/1994 | Lehmann | 73/49.3 |
| 5,891,076 A | | 4/1999 | Fabo | |
| 5,919,476 A | | 7/1999 | Fischer et al. | |
| 5,939,619 A | * | 8/1999 | Achter et al. | 73/40.7 |
| 6,050,133 A | * | 4/2000 | Achter et al. | 73/40.7 |
| 6,450,012 B1 | * | 9/2002 | Mayer et al. | 73/49.3 |
| 6,460,405 B1 | * | 10/2002 | Mayer et al. | 73/40.7 |

FOREIGN PATENT DOCUMENTS

| | | | | |
|---|---|---|---|---|
| DE | 4212938 A1 | * | 10/1993 | 73/52 |
| JP | 402122234 A | * | 5/1990 | 73/40.7 |

\* cited by examiner

*Primary Examiner*—Edward Lefkowitz
*Assistant Examiner*—Michael Cygan
(74) *Attorney, Agent, or Firm*—Paul L. Sjoquist

(57) ABSTRACT

A fixture for testing a sealed container for possible leakage, having a removable cover and a silicon gel gasket affixed to the undersurface of the cover, and having a lower housing with a cavity for receiving the sealed container, the container top surface being isolated from the rest of the container surfaces by the silicon gel gasket.

5 Claims, 4 Drawing Sheets

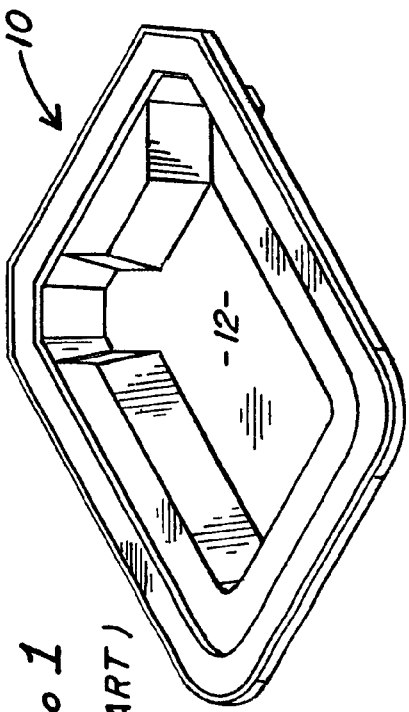
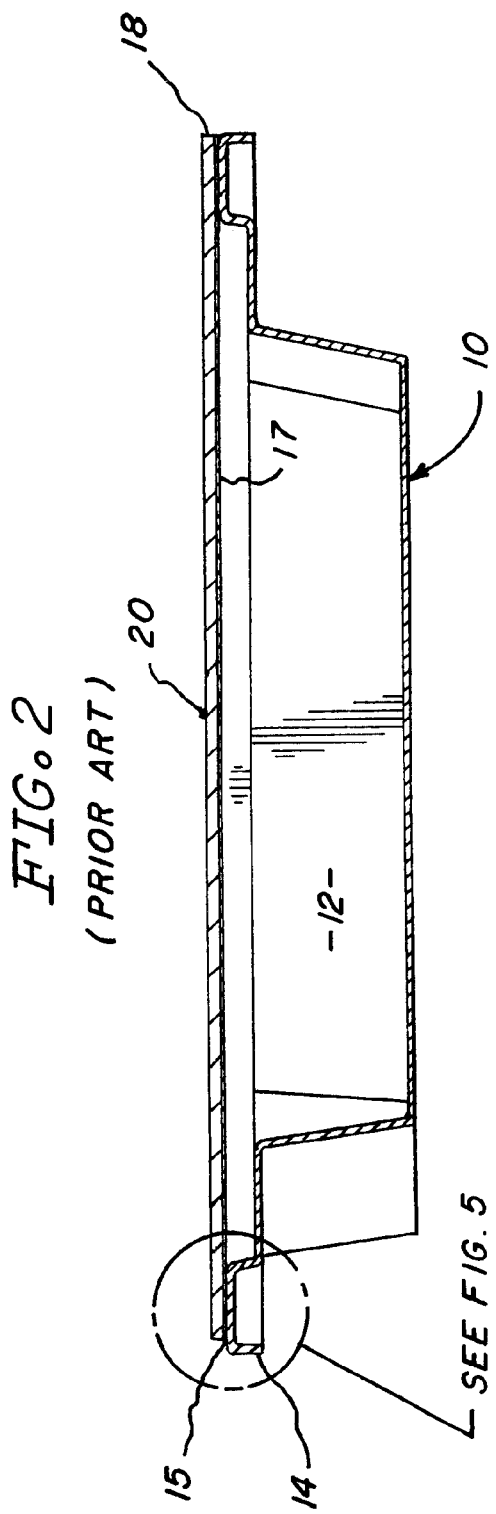
FIG. 1 (PRIOR ART)
FIG. 2 (PRIOR ART)

APPARATUS FOR CONDUCTING LEAKAGE TESTS ON SEALED PACKAGES

BACKGROUND OF THE INVENTION

The present invention relates generally to devices for measuring gas leakage from sealed packages of various types, usually made from plastic film or molded plastic. More particularly, the invention relates to a fixture for receiving a package for testing, having means for applying a temporary seal about the periphery of the package, and means for admitting a gas into the package interior, and means for collecting the gas which becomes emitted from the package interior and measuring the quantity of collected gas, to establish the precise amount of leakage from the package. The usefulness of the invention lies in the fact that the leak measurement fixture and related equipment to be re-used many times, for measuring many packages, with accuracy and consistency.

The invention relates particularly to the type of packaging described in copending U.S. application Ser. No. 09/845,914, entitled "Multi-port Gas Leakage Measurement Fixture," filed Apr. 30, 2001, owned by the assignee of the present invention, and packages similarly constructed of plastics for the purpose of holding articles in a confined and relatively sterile, isolated environment.

It is a principle object of the present invention to provide a fixture for the measurement equipment which provides a measure of leakage from packages and the like.

An advantage of the present invention is that it provides a quick and consistent measurement technique for many packages, thereby providing data of the same or very similar accuracy.

Other and further objects and advantages of the invention will become apparent from the following specification and claims and with reference to the appended drawings.

SUMMARY OF THE INVENTION

A fixture for holding a package of a predetermined size and design, the fixture having a lower chamber and a cover attachable to the chamber, for fitting over the package to be tested, the cover having a shaped, multi-layer, silicone gel peripheral coating which seals against the perimeter of the package top surface when the cover is closed, providing a gas-tight seal between the cover and the package top surface, but being sufficiently resilient so as to not disturb any pre-existing leaks which might be present between the package and the underside of the package top. The gas which leaks from the package into the inside volume of the fixture is collected and measured.

BRIEF DESCRIPTION OF THE DRAWINGS

FIG. 1 shows a typical prior art plastic container of the type.

FIG. 2 shows a side view in cross section of the prior art.

DESCRIPTION OF THE PREFERRED EMBODIMENT

Figure 3:
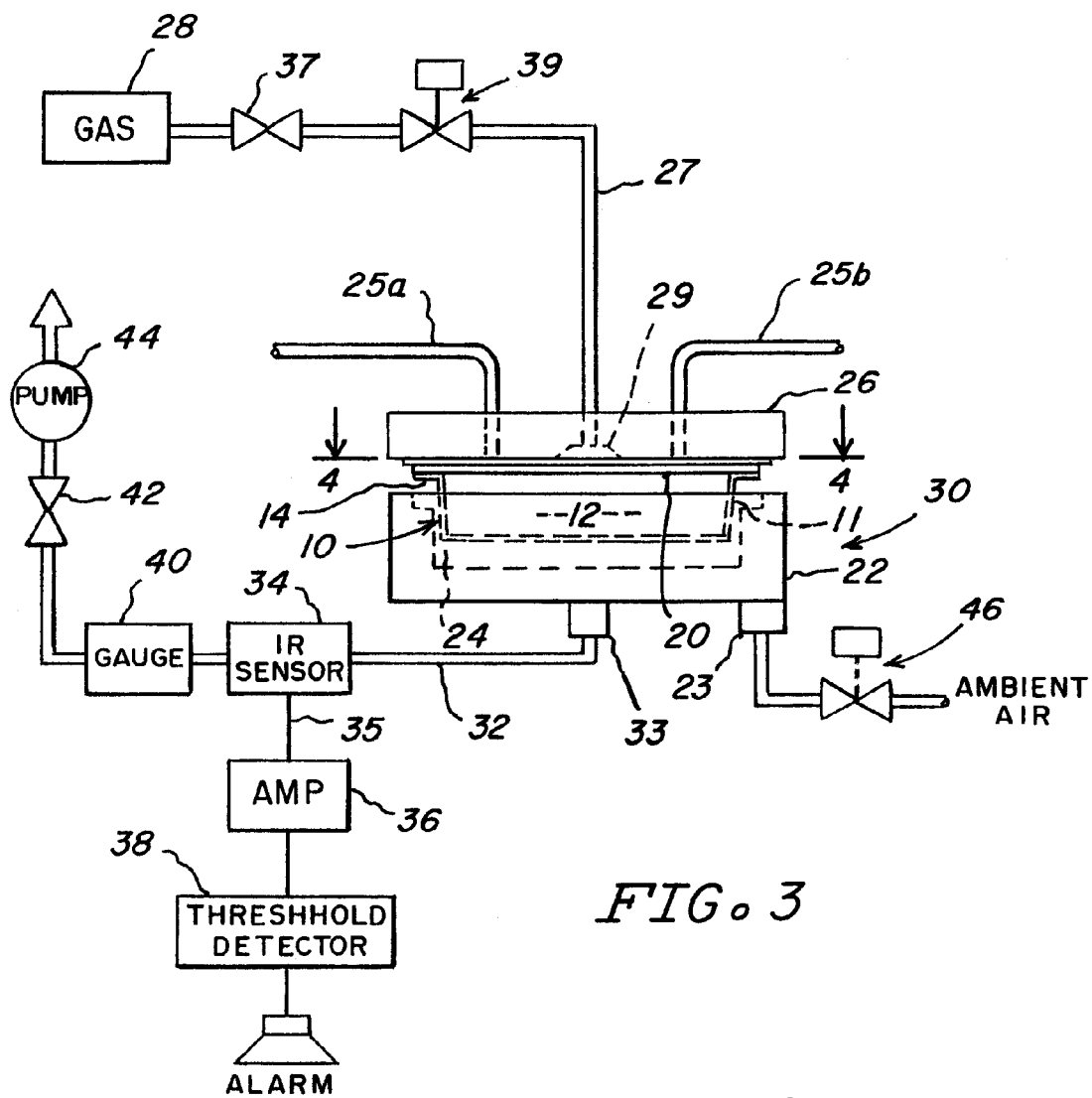
FIG. 3 shows a schematic diagram of the fixture and container, relative to the test equipment used for performing the leakage tests.

Referring to the drawing figures, In the figures, like reference characters refer to the same or functionally similar parts of the respective components illustrated in each of the figures. FIG. 1 shows an isometric view of a typical plastic container 10 for holding a sterilized product. The container 10 normally has a sealed cover (not shown) over the top open area, and a product of a particular type (not shown) inside the container volume. One arrangement of test equipment, and the process for testing, is disclosed in co-pending patent application Ser. No. 09/845,914, filed on Apr. 30, 2001, and entitled "Multi-port Gas Leakage Measurement Fixture."

FIG. 2 shows the container of FIG. 1 in a side elevation view in cross-section, along a line bisecting the length dimension of the container 10. In this view, the sealed cover 20 is shown adhered to the top edge of the container 10, and an adhesive material 15 is deposited between the cover 20 and the container upper surface along flange 14. A chamber 12 is formed inside container 10 after the sealed cover 20 is applied to the flange 14.

The cover 20 is made from a sheet of gas-permeable material known as TYVEK® 1073-B, which is a medical grade material available from E.I. duPont de Nemours & Co. This material is made in sheet form from continuous strands of spunbonded, high-density polyethylene. The strands are very fine, and are randomly oriented and bonded together by heat and pressure during manufacture. The adhesive, which is applied to the material after manufacture, is heat sealable to a wide variety of thermoforming plastics, including PVC, Styrene, PETG, Barex, Polycarbonate, and PP; it usually forms a clean, peelable bond with the material to which it is heat sealed. On occasion, leaks can result between the TYVEK and the material to which it is heat sealed during the manufacturing process, because of incorrect parameters in the heat sealing process, dirt and burr accumulation on the surface to be sealed, or pinholes in the materials. Such leaks can become a serious problem in the case of packages which must maintain a sterile interior, in order to avoid bacterial and other contamination which might seriously harm a patient whom is being treated.

The present invention provides a needed solution for testing such packages for leakage of the type described. The testing process is complicated, however, because the TYVEK material itself allows for the passage of gases due to the porous nature of its construction. Therefore, any test gas which may be introduced into the package as a leakage indicator will quite naturally escape through the TYVEK surface, thereby masking leaks which might exist in the package or seals. Whereas, TYVEK porosity allows for the passage of gases, it prevents the passage of bacteria; however, leaks in the package or seals may not prevent bacterial passage, and therefore might allow for bacterial contamination of the articles contained within the package.

FIG. 3 shows a schematic diagram of the test setup, including the fixture 30 which is the subject of the present invention. Fixture 30 has a lower housing 22 which encloses a chamber 24 of sufficient size to hold the container 10. The housing 22 is made from a non-gas-permeable material. A cover 26 can be clamped over the housing 22, to tightly seal the cover against the flange 14 of the package and the lower housing 22. The cover 26 has a suction cup 29 for sealing against the layer 20, and the suction cup 29 is coupled to an inlet gas conduit 27 connected to a gas source 28 via a solenoid valve 39 and a needle valve 37. A pair of outlet gas conduits 25a, 25b are connected through cover 26, and are typically discharged to atmosphere.

Lower housing 22 also has an outlet 33 which is connected to a suitable detector 34, via a conduit 32. The detector 34 may be an infrared (IR) sensor, as shown, or some other type of sensor. The IR sensor 34 has electrical output lines 35 connected to an amplifier 36, and amplifier 36 is connected to a threshhold detector 38. Threshhold detector 38 is connected to suitable alarm circuits, as desired. IR sensor 34 also has an outlet gas conduit connected to a gauge 40, which is connected via a flow control valve 42 to a vacuum pump 44. Vacuum pump 44 exhausts to ambient air.

Lower housing 22 also has a gas inlet 23 which is connected via internal passages in housing 22 to a plurality of further outlets along an upper edge of housing 22. Ambient air is conveyed via a solenoid valve 46 to the gas inlet 23, as is more fully explained in copending U.S. application Ser. No. 09/845,914, filed Apr. 30, 2001.

Figure 4:
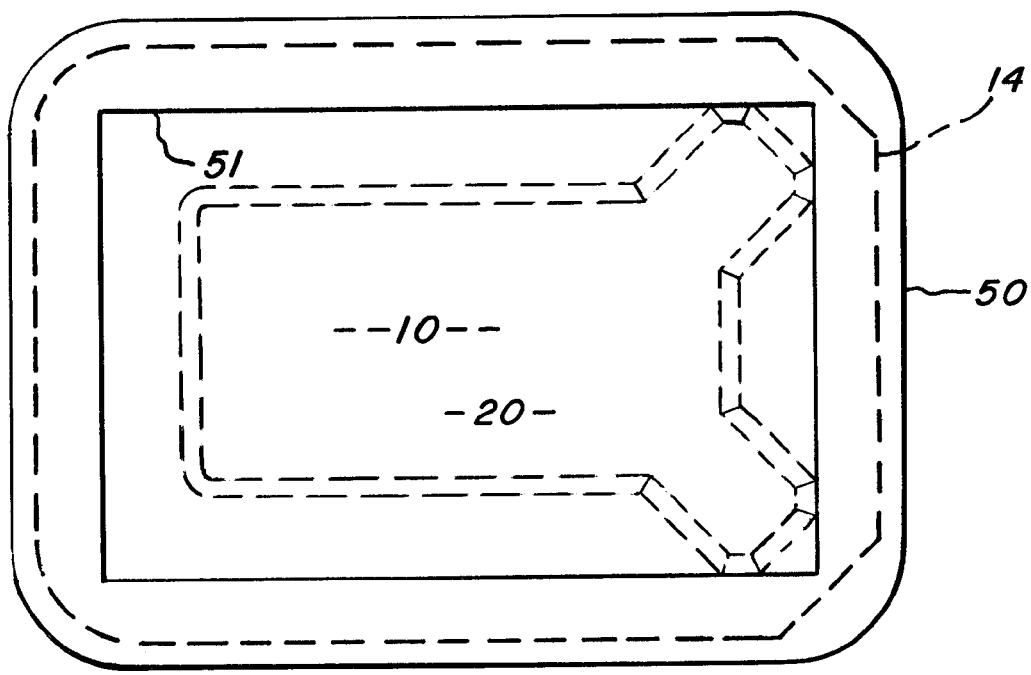
FIG. 4 shows a view taken along the lines 4—4 of FIG. 3.

FIG. 4 shows a view taken along the lines 4—4 of FIG. 3, showing a top view of the fixture seal 50 overlying the container 10. The fixture seal 50 is adhered to the underside of housing cover 26, and is sized to overhang the edges of flange 14 of container 10. The fixture seal 50 has an interior cutout 51, exposing the top surface of the container 10 Tyvek® cover 20.

Figure 5:
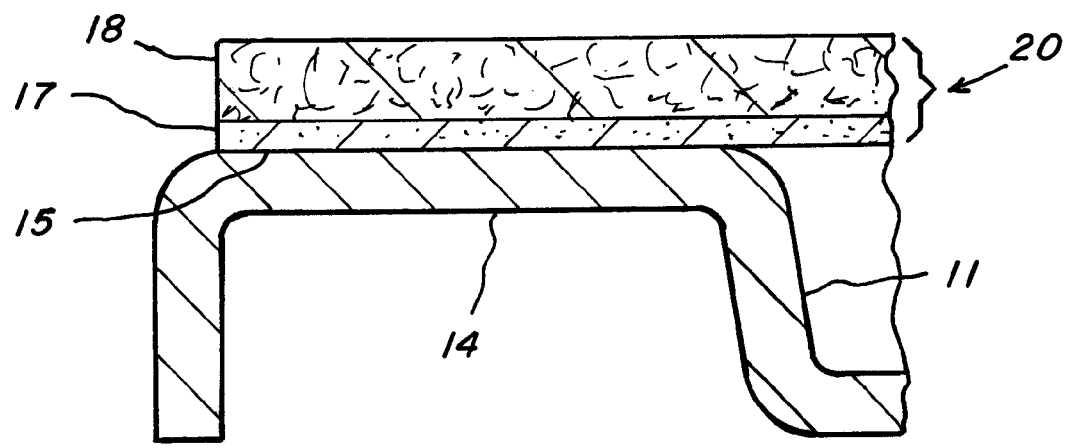
FIG. 5 shows a cross section view of an expanded edge portion of FIG. 2.

FIG. 5 shows an expanded portion of an edge of container 10; specifically, a portion showing the flange 14 and its attachment to the underside of the Tyvek cover 20. The Tyvek cover 20 is porous and has a relatively uneven or rough surface at a microscopic level. The cover is typically about 9 mils thick, including the porous sheet 18 and a thin layer of hard, non-tacky adhesive 17 sprayed on its undersurface. After the adhesive is heated, it partially absorbs into the porous Tyvek, and when pressure is applied between the flange 14 and the cover 20, the adhesive becomes quite tacky and adheres to the flange 14. When the sealing process is completed, the Tyvek material and the flange 14 are bonded together, and the adhesive layer 17 is measurably absorbed into the Tyvek material along the flange 14. The adhesive material therefore fills many of the pores of the Tyvek along the flange 14 and renders the Tyvek along this flange less porous to the flow of gas outwardly along the edge. Testing has shown that gas flow outwardly through the Tyvek edge is about 20–25 time greater before the adhesive is applied than it is after the adhesive is applied, indicating that the absorbed adhesive fills the Tyvek pores to within 0.2–0.3 mils of the Tyvek surface, on the average. This fact becomes important when leakage testing of the container and Tyvek cover is conducted, for it means that some leakage will occur through the Tyvek edge itself, and therefore any leakage measured during the test is through holes in the container 20 or imperfect adhesion between the Tyvek cover and the flange 14.

The leakage testing is complicated by the need to isolate the top surface of the Tyvek material from the rest of the surfaces of the container 10, including the Tyvek edges and the bond between the cover 20 and the flange 14, and the surface area of the plastic container 10. This is because the Tyvek is naturally very porous and will leak a great amount of any test gas which is pumped into the container 10, thereby obscuring any measurable test results from a leakage test. In the prior art, this problem was solved by applying an adhesive tape to the edges of the top surface of the cover 20, and then clamping a test housing cover over the tape to create an isolated chamber above the Tyvek upper surface and a second chamber from the top Tyvek surface to include all of the remaining surface area of the container 10. The tape had to be somewhat soft, in order to seal with a reasonable clamping force, so that the clamping force of the test did not itself seal the very leaks that the test was supposed to discover. Also, the tape adhesive had to have some thickness so that it would fill the irregular surface bumps found on Tyvek material. However, if the tape were too soft and too thick, the tape leaves a sticky residue on the package after the test has been completed, and thereby renders the package unsaleable. The solution to this problem forms the primary basis for the present invention.

Figure 6:
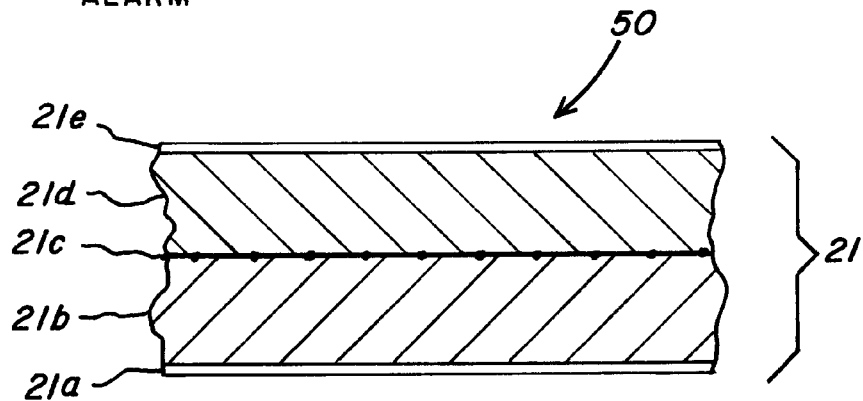
FIG. 6 shows the silicone gel material in cross section.

FIG. 6 shows a cross section view of a silicone gel housing cover seal 21, which is formed of several layers to advantageously solve the problem described above. The layer 21a is a moderately tacky silicone gel coating several mils thick, for sealing against the Tyvek material. This tacky surface is very soft, durable and easy to clean with soap and water; it has low peel strength and leaves no residue on the Tyvek surface. The next layer 21b is a slightly firmer silicone gel material that is soft to the touch, but becomes firmer as pressure is applied. This layer supports the first layer 21a when pressure or force is applied to urge the tacky layer 21a into the surface pores of the Tyvek material. The next layer 21c is a mesh fabric layer that adds strength to the entire structure 21, and prevents the various silicone gel materials from stretching, tearing and otherwise becoming hard to handle. The next layer 21d is an ultra soft silicone gel layer to provide a good gasket seal against the undersurface of the housing cover to which it is attached. The last layer 21e is a highly tacky silicone gel coating with a peel strength greater than layer 21a, to adhere the silicone gel structure 21 to the undersurface of the housing cover 26, more or less permanently. All five of the foregoing layers are joined together to make one gasket material unit, wherein each layer cooperates to provide an optimum leakage gasket without damaging the container during the test, and enabling the container to be removed from the test fixture after the test to permit another container to be inserted into the fixture for a new test.

The silicone gel material described herein is available with the desired characteristics and specifications from Implantech Associates, Inc., of Ventura, Calif. 93003, sold as a medical grade high strength silicon gel, preferably Type 10068-002 sheeting.

Figure 7:
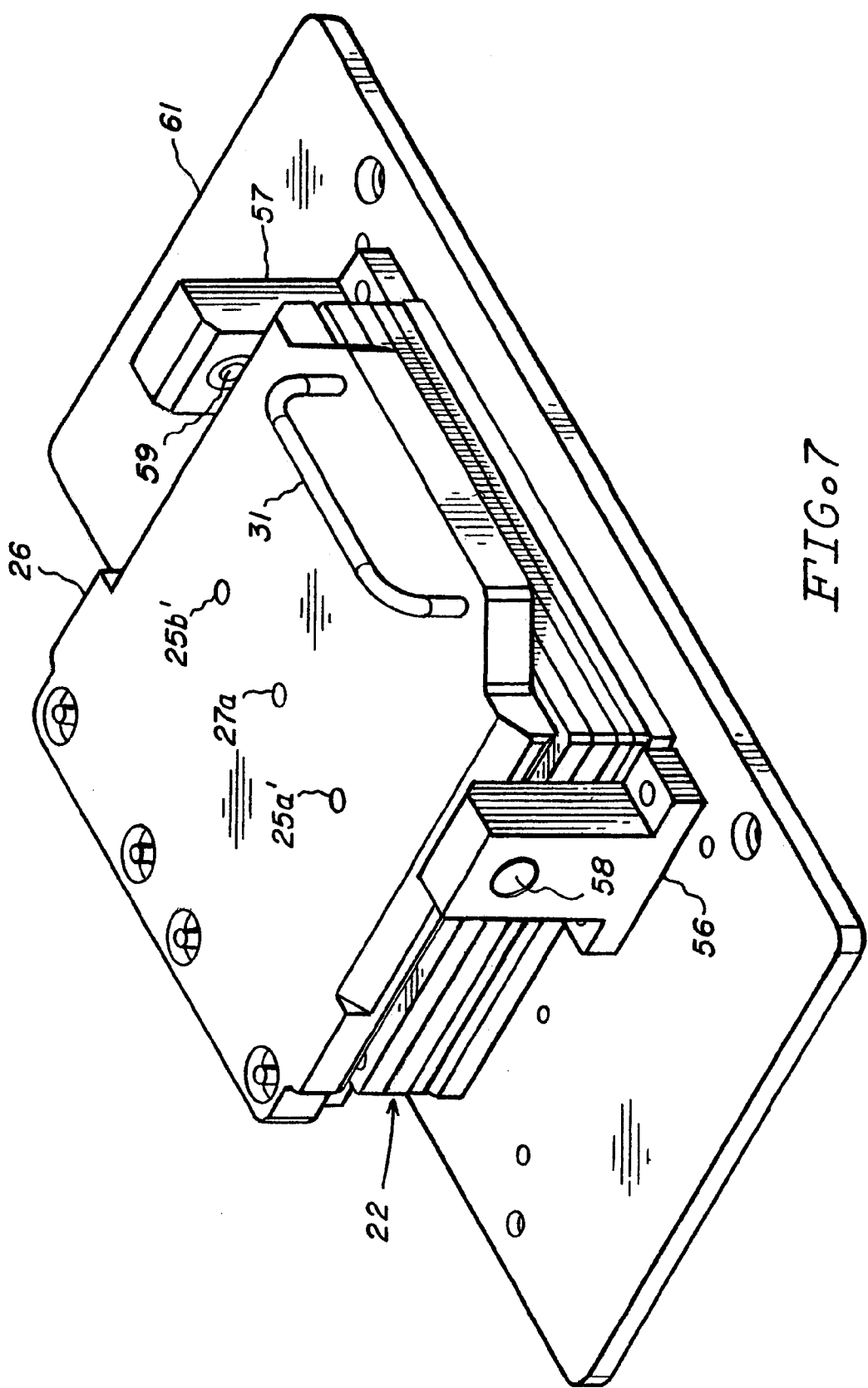
FIG. 7 shows an isometric view of the test fixture in a closed position.

FIG. 7 shows the test fixture in isometric view. The fixture is mounted on a mounting plate 61. The lower housing 22 is fastened to mounting plate 61, and the housing cover 26 is removably mounted to the lower housing 22. Openings 25a' and 25b' are connectable to outlet gas conduits, and opening 27a is connectable to inlet gas conduit 27. A pair of housing latches 56, 57 is affixed to mounting plate 61, and each latch has a spring-biased detent such as detent 59 on latch 57, which is installed through an opening such as 58 on latch 56. Housing cover 26 may be either hinged from lower housing 22, or may be entirely removable therefrom. A handle 31 is available for assisting in the removal process.

In operation, the silicone gel material 21 has a sufficient thickness so that it can be affixed to the undersurface of housing cover 26 and project outwardly to compress against the Tyvek cover when the housing cover 26 is fully closed against the lower housing 22. A trace gas is then introduced into the container 10 via conduit 27 and suction cup 29 through the Tyvek cover, and is removed by conduits 25a and 25b. Any trace gas which remains inside container 10 is available for leakage testing, because trace amounts of this gas may pass through the container/Tyvek seal or the plastic container material. After the leakage test has been completed, the trace gas is diffused from inside the container to the exterior ambient air by the porousity of the cover material.

The present invention may be embodied in other forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for testing for a gas leak through an opening in an otherwise sealed container, comprising:
    a) a lower housing having a cavity sized to receive said container in a chamber formed by said cavity, and having a gas outlet for removing gas accumulated in said chamber;
    b) a housing cover sized for sealable fitting against said lower housing, and having a silicon gel gasket sized for sealable fitting against said container, thereby forming a chamber in the housing cover in the region adjacent the container; said silicon gel gasket further comprising a silicon gel layer and a mesh fabric proximately centered in said silicon gel layer;
    c) passages through said housing cover and into said housing cover chamber, connectable to a source of trace gas and to an exhaust port; and
    d) a gas sensor connected to said lower housing gas outlet, having means for measuring the gas content in said chamber.

2. The apparatus of claim 1, wherein said silicon gel gasket further comprises a first outer layer having a first tacky coating which affixes the silicon gel against the undersurface of said housing cover.

3. The apparatus of claim 2, wherein said silicon gel gasket further comprises a second outer layer, on a silicon gel outer surface opposite said first outer layer, said second outer layer comprising a second tacky layer coating, less tacky than said first coating, for sealing against a surface of said container, but being removable therefrom.

4. An apparatus for testing a container for gas leaks, wherein the container has a porous cover which passes gas readily, comprising
    a) a housing having a cavity formed to accept the container with the cover proximate the top of the cavity, the bottom of said cavity having an outlet gas conduit connected to a sensor;
    b) a cover housing sized for snugly fitting over said housing cavity, said cover housing having means for introducing gas into said container through said porous cover;
    c) a gasket made from two layers of silicon gel material separated by a mesh material, the two layers of silicon gel material being bonded to the mesh material, said gasket being affixed to the underside of said cover housing and sized to fit against said porous cover adjacent an edge thereof; and
    d) means for compressing said cover housing against said housing and to simultaneously compress said silicon gel material against the respective edges of said porous cover; whereby a seal is created, isolating said cover from the remainder of said container.

5. The apparatus of claim 4, wherein said gasket further comprises a coating of tacky adhesive on a surface of one of said two layers of silicon gel, said adhesive having a sufficiently strong adhesive to adhere non-removably to said cover housing, and further comprises a less tacky adhesive on another surface of a layer of silicon gel, said adhesive being peelable from contact with said porous cover material.

* * * * *